United States Patent [19]
Yaji

[11] Patent Number: 5,353,089
[45] Date of Patent: Oct. 4, 1994

[54] FOCUS DETECTION APPARATUS CAPABLE OF DETECTING AN IN-FOCUS POSITION IN A WIDE FIELD OF VIEW BY UTILIZING AN IMAGE CONTRAST TECHNIQUE

[75] Inventor: Tsuyoshi Yaji, Hachioji, Japan

[73] Assignee: Olympus Optical Co., Ltd., Tokyo, Japan

[21] Appl. No.: 839,692

[22] Filed: Feb. 20, 1992

Related U.S. Application Data

[63] Continuation of Ser. No. 624,189, Dec. 6, 1990, abandoned.

[30] Foreign Application Priority Data

Dec. 12, 1989 [JP] Japan .................................. 1-322884

[51] Int. Cl.$^5$ .......................... G03B 3/00; G03B 13/18
[52] U.S. Cl. ..................................... 354/402; 354/404; 352/140; 250/201.7; 348/347; 348/356
[58] Field of Search ............... 354/402, 404, 406, 407, 354/405; 352/140; 358/227; 250/201.2, 201.8, 201.7

[56] References Cited

U.S. PATENT DOCUMENTS 4,878,079 10/1989 Hamada et al. ................... 354/402
4,990,947 2/1991 Komiya et al. ................... 354/402

FOREIGN PATENT DOCUMENTS 61-18271 1/1986 Japan .

OTHER PUBLICATIONS

NHK Technical Research vol. 17, No. 1(86); pp. 21-37.

Primary Examiner—Michael L. Gellner
Assistant Examiner—Cassandra Spyrou
Attorney, Agent, or Firm—Frishauf, Holtz, Goodman & Woodward

[57] ABSTRACT

A focus detection apparatus of this invention can select one of a plurality of distance measurement areas in a photographing area, and obtains an in-focus point on the basis of contrast data of an object in the selected distance measurement area, thereby driving a photographing lens. When the selected distance measurement area is set by an area setting unit, an MTF characteristic value corresponding to the selected distance measurement area stored in a ROM is read out. An MPU obtains a contrast peak value of a first detection frequency component, and detects a position of a first peak value. The MPU predicts an existing area of a contrast peak value of a second detection frequency component higher than the first detection frequency component on the basis of the detected first peak value position and the MTF characteristic value read out from the ROM. The MPU obtains the contrast peak value of the second detection frequency component in accordance with the predicted existing area of the peak value to detect a second peak value. The MPU drives the photographing lens in accordance with the positions of the first and second peak values.

31 Claims, 9 Drawing Sheets

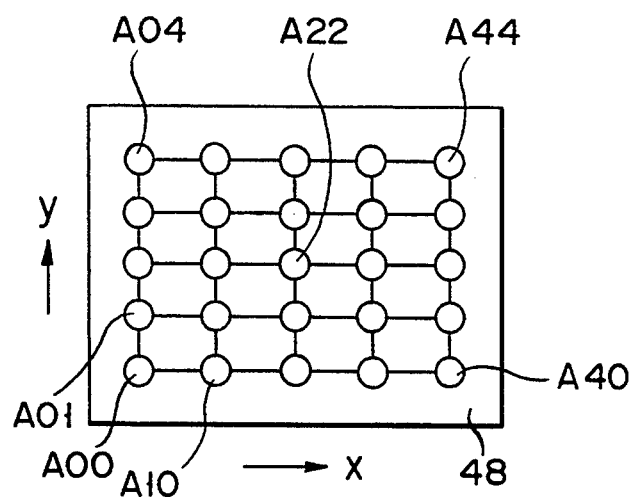
FIG. 5
| y \ x | 0 | 1 | 2 | 3 | 4 |
|---|---|---|---|---|---|
| 0 | H00 | H10 | H20 | H30 | H40 |
| 1 | H01 | H11 | H21 | H31 | H41 |
| 2 | H02 | H12 | H22 | H32 | H42 |
| 3 | H03 | H13 | H23 | H33 | H43 |
| 4 | H04 | H14 | H24 | H34 | H44 |
FIG. 6
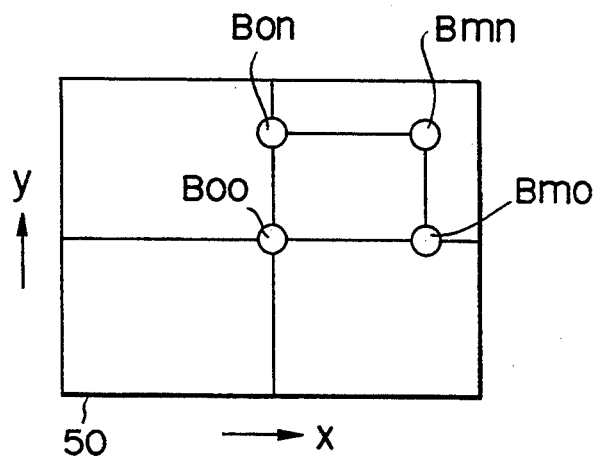
FIG. 7

FOCUS DETECTION APPARATUS CAPABLE OF DETECTING AN IN-FOCUS POSITION IN A WIDE FIELD OF VIEW BY UTILIZING AN IMAGE CONTRAST TECHNIQUE

This application is a continuation of application Ser. No. 07/624,189, filed Dec. 6, 1990, now abandoned.

BACKGROUND OF THE INVENTION

1. Field of the Invention

The present invention relates to a focus detection apparatus and, more particularly, to a focus detection apparatus for performing focus detection by utilizing an object light beam passing through a photographing lens.

2. Description of the Related Art

Conventionally, various proposals have been made about a focus detection method of detecting an in-focus position by receiving a light beam from an object. First, as a method of detecting a contrast of an object, and then driving a photographing lens to maximize the contrast so as to obtain an in-focus point, "a hill-climbing servo system" described in, e.g., NHK Technical Research Vol. 17 No. 1 (65) pp. 21-37, and the like is known. As an invention associated with a camera comprising a focus detection apparatus adopting the hill-climbing servo system, one disclosed in Published Unexamined Japanese Patent Application No. 61-18271 is known.

This focus detection apparatus can perform a focus detection operation of not only a central portion of a photographing frame (to be referred to as a frame hereinafter), but also an object image at a peripheral portion of the frame, and similarly change a distance measurement area with reference to the central portion of a light-receiving surface. Therefore, according to this focus detection apparatus, a focus detection operation can be performed even if an object image is not located near the center of the frame, resulting in convenience for a user.

However, the camera disclosed in Unexamined Japanese Patent Application No. 61-18271 described above can only similarly change a distance measurement area with respect to the center of the frame. Furthermore, since the focus detection method complies with the "hill-climbing servo system" described above, a focal point is detected on the basis of MTF (Modulation Transfer Function) characteristics as contrast information for a focusing operation. In this case, detection precision may be impaired depending on a detection spatial frequency (to be simply referred to as a frequency hereinafter).

As a countermeasure against the above-mentioned problems, focus detection operations for a plurality of frequencies ranging from a low frequency to a high frequency may be performed. However, MTF characteristics at a peripheral portion of the frame are considerably changed depending on the frequency as compared to those at the central portion of the frame. For this reason, even if a focus detection at a high frequency is performed by the "hill-climbing servo system" on the basis of in-focus point data detected at a low frequency, it is difficult to detect a peak point of the MTF characteristics.

As for MTF characteristics for a standard object, deviations of peak points of MTF characteristics as in-focus points for respective frequencies at the central and peripheral portions of the frame are considerably different from each other at the central and peripheral portions of the frame in sagittal and meridional directions. Therefore, it is difficult to obtain a high-frequency in-focus point on the basis of a low-frequency in-focus point in a focusing operation for a peripheral portion, as described above.

SUMMARY OF THE INVENTION

It is, therefore, an object of the present invention to provide a focus detection apparatus which stores MTF characteristic values for a plurality of distance measurement areas of a frame, predicts an in-focus position on the basis of these data, and can quickly and precisely perform a focus detection operation of an object image on a peripheral portion of the frame.

According to an aspect of the present invention, there is provided a focus detection apparatus comprising distance measurement area setting means for selectively setting one of a plurality of distance measurement areas of a photographing area defined by a photographing lens, an area type charge storage type photoelectric conversion element for receiving an object light beam and photoelectrically converting the object light beam, contrast signal peak value detection means for detecting a contrast signal corresponding to a specific detection frequency based on an output signal, corresponding to the set distance measurement area, of outputs from the photoelectric conversion element while changing a defocus amount of the object light beam received by the photoelectric conversion element, and detecting a peak value of the contrast signal, storage means for storing a plurality of deviation amounts of a peak position of the contrast signal detected at the specific detection frequency for a single object in units of distance measurement areas, and prediction means for correcting the peak value of the contrast signal at the specific detection frequency in the set distance measurement area using the deviation amount of the peak position stored in the storage means, thereby predicting an in-focus position.

According to another aspect of the present invention, there is provided a focus detection apparatus comprising a charge storage type photoelectric conversion element for receiving an object light beam and photoelectrically converting the object light beam, contrast signal peak value detection means for detecting a contrast signal corresponding to a reference detection frequency on the basis of an output signal from the photoelectric conversion element while changing a defocus amount of the object light beam received by the photoelectric conversion element, and detecting a peak value of the contrast signal, storage means for prestoring deviation amounts of peak values of contrast signals corresponding to other detection frequencies with respect to the reference detection frequency, and prediction means for correcting the peak value of the contrast signal corresponding to the reference detection frequency detected by the contrast signal peak value detection means using the deviation amount of the peak value stored in the storage means, thereby predicting an in-focus position.

According to still another aspect of the present invention, there is provided a focus detection apparatus comprising a charge storage type photoelectric conversion element for receiving an object light beam and photoelectrically converting the object light beam, contrast signal peak value detection means for detecting a contrast signal corresponding to a specific detection frequency on the basis of an output signal from the photoelectric conversion element while changing a defocus amount of the object light beam received by the photoelectric conversion element, and detecting a peak value of the contrast signal, storage means for prestoring deviation amounts of peak position of contrast signals corresponding to other detection frequencies with respect to the specific detection frequency, prediction means for correcting the peak value of the contrast signal corresponding to the specific detection frequency detected by the contrast signal peak value detection means using the deviation amount of the peak position stored in the storage means, thereby predicting an in-focus position, and calculation means for calculating, on the basis of an in-focus position based on the peak value of the contrast signal detected by the contract signal peak value detection means, and the in-focus position associated with the prediction means, an aperture value with which the two in-focus positions fall within a depth of field.

According to a further aspect of the present invention, there is provided a focus detection apparatus comprising focus detection area setting means for selecting and setting one distance measurement area to be subjected to focus detection from a plurality of distance measurement areas in a photographing area, a photoelectric conversion element, arranged in correspondence with the plurality of distance measurement areas, for receiving an object light beam, and photoelectrically converting the object light beam, contrast signal peak value detection means for detecting a peak value of a contrast signal corresponding to a first detection frequency on the basis of an output from the photoelectric conversion element, peak position prediction means for predicting a peak position of a contrast signal corresponding to a second detection frequency in accordance with the detected peak value, in-focus point detection means for detecting a peak value of the contrast signal corresponding to the second detection frequency near the predicted peak position on the basis of the output from the photoelectric conversion element, and obtaining an in-focus point, and MTF characteristic value storage means for storing MTF characteristic values, each representing a difference between the peak positions of the contrast signals corresponding to the first and second detection frequencies, in correspondence with the plurality of distance measurement areas, wherein the peak position prediction means obtains the predicted peak position on the basis of a stored value corresponding to the distance measurement area stored in the MTF characteristic value storage means, and the output from the contrast signal peak value detection means.

It is another object of the present invention to provide a focus detection apparatus for obtaining an in-focus point on the basis of contrast data of an object corresponding to a plurality of detection frequencies, comprising a plurality of photoelectric conversion elements, arranged in correspondence with a plurality of distance measurement areas in a photographing area, for photoelectrically converting an object light beam passing through a photographing lens, storage means for storing MTF characteristic values each representing a difference between a peak position of a contrast signal corresponding to a reference detection frequency, and a peak position of a contrast signal corresponding to another detection frequency, in correspondence with the plurality of distance measurement areas, selection means for selecting one of the plurality of distance measurement areas in the photographing area, readout means for reading out the MTF characteristic value corresponding to the distance measurement area selected by the selection means from the storage means, a relay lens arranged in an optical path between the photographing lens and the photoelectric conversion elements, relay lens driving means for driving the relay lens, peak value detection means for detecting a peak value of the contrast signal corresponding to the reference detection frequency on the basis of an output from the photoelectric conversion element corresponding to the selected distance measurement area upon driving of the driven relay range, and means for limiting a driving area, which is used to detect a peak value of the contrast signal corresponding to another detection frequency, of the relay lens driving means on the basis of a detection result of the detection means, and the readout MTF characteristic value.

It is still another object of the present invention to provide a focusing method of obtaining an in-focus point based on contrast data of an object in a distance measurement area which is selected from a plurality of distance measurement areas in a photographing area, and driving a photographing lens, comprising the step of setting the selected distance measurement area, the step of reading out an MTF characteristic value corresponding to the selected distance measurement area stored in storage means, the step of obtaining a contrast peak value of a first detection frequency component, and detecting a position of a first peak value, the step of predicting an existing area of a contrast peak value of a second detection frequency component higher than the first detection frequency component on the basis of the readout MTF characteristic value and the detected position of the first peak value, the step of obtaining the contrast peak value of the second detection frequency component in accordance with the predicted existing area of the peak value, and detecting a second peak value, and the step of driving the photographing lens in accordance with the positions of the first and second peak values.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a plan view of the central portion of the frame showing a designated distance measurement area of the focus detection apparatus shown in FIG. 1;

FIG. 6 shows a table of MTF characteristic values stored in a ROM of the focus detection apparatus shown in FIG. 1;

FIG. 7 is a plan view of a frame showing a modification of a designated distance measurement area;

DETAILED DESCRIPTION OF THE PREFERRED EMBODIMENTS

An embodiment of the present invention will be described below with reference to the accompanying drawings.

Figure 1:
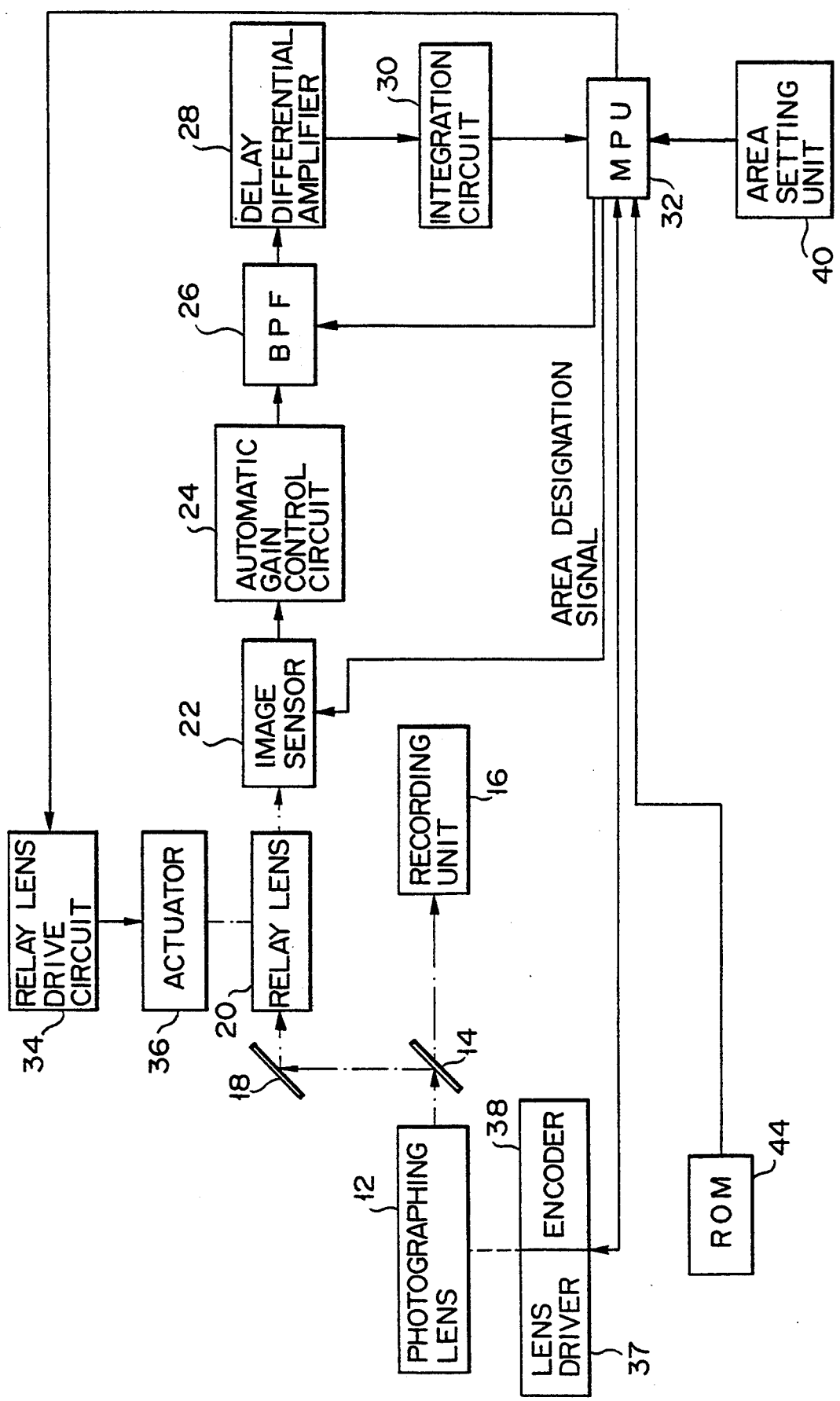
FIG. 1 is a block diagram of a focus detection apparatus according to an embodiment of the present invention.

FIG. 1 is a block diagram of a focus detection apparatus according to an embodiment of the present invention. A light beam from an object passes through a photographing lens 12, and is branched by a half mirror 14 toward a recording unit 16 as a photographing light beam, and toward a mirror 18 as a focus detection light beam. Note that the recording unit 16 may comprise a photographing unit using a silver chloride film or an image pickup element. The focus detection light beam is reflected by the mirror 18, and is focused on an image sensor 22 as a charge storage type photoelectric conversion element through a relay lens 20. A photoelectrically converted output from the image sensor 22 is input to an automatic gain control circuit 24.

The output from the control circuit 24 is filtered by a band-pass filter (BPF) 26, and is then processed by a delay differential amplifier 28. The output from the amplifier 28 is subjected to integral processing in an integration circuit 30. The processed signal is input to a microprocessing unit (MPU) 32 as a contrast signal. The MPU 32 outputs a drive signal to a relay lens drive circuit 34 to perform a focus detection operation, thereby driving the relay lens 20 via an actuator 36. In order to extend the photographing lens 12 to a detected in-focus position, the MPU 32 outputs a drive signal to a lens driver 37. Thus, the lens driver 37 causes the photographing lens 12 to extend to the in-focus position. Note that an extending amount of the photographing lens 12 is always detected by an encoder 38, and is input to the MPU 32.

The BPF 26 performs filtering processing in a frequency band based on a detection frequency f instructed by the MPU 32. The delay differential amplifier 28 amplifies a difference delayed by one pixel of the image sensor 22.

The MPU 32 controls the overall focus detection apparatus, and includes a peak value detection means for obtaining a peak value of an MTF signal used as a contrast signal, and an in-focus position prediction means for predicting an in-focus position by using this peak value and an MTF characteristic value (to be described later). The MPU 32 receives an area setting signal selected by an area setting unit 40 as a focus detection area setting means, and outputs an area designation signal according to this setting signal to the image sensor 22. Note that reference numeral 44 denotes a ROM as an MTF characteristic value storage means for storing MTF characteristic values (to be described in detail later) corresponding to areas selected by the area setting unit 40. The MPU 32 reads out the MTF characteristic value from the ROM 44, and predicts an in-focus position on the basis of the read out characteristic value.

Figure 2:
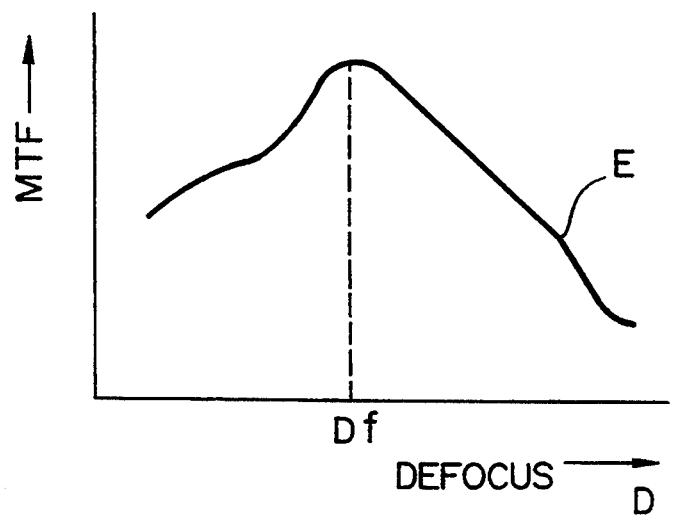
FIG. 2 is a graph for explaining a peak position of MTF characteristics in association with the focus detection apparatus shown in FIG. 1.

A peak value of the contrast signal is a value of a peak point on an MTF characteristic curve as a function of a defocus D, as shown in FIG. 2, and an in-focus point at that time is represented by a defocus Df. The above-mentioned MTF characteristic value corresponds to a synthetic value of sagittal and meridional MTF values.

Figure 3:
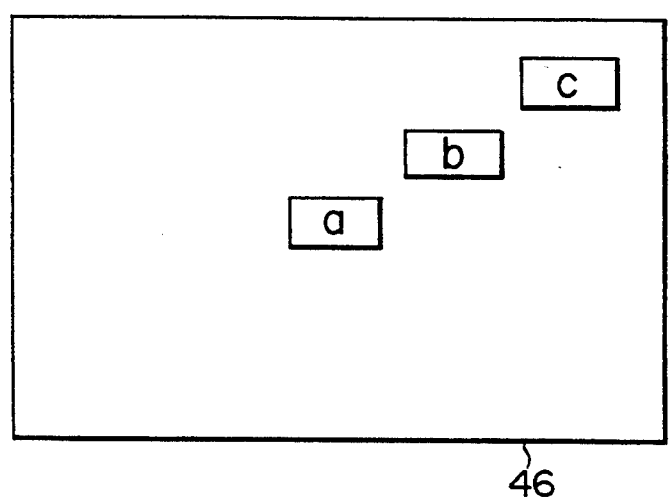
FIG. 3 is a view showing distance measurement area designation positions on a frame in association with the focus detection apparatus shown in FIG. 1.

An area in a frame where a focal point is to be detected, e.g., one of areas a, b, and c, in a frame 46 shown in FIG. 3 is selected by the area setting unit 40 as the focus detection area setting means, and the setting signal is input to the MPU 32, as described above.

Figure 4A:
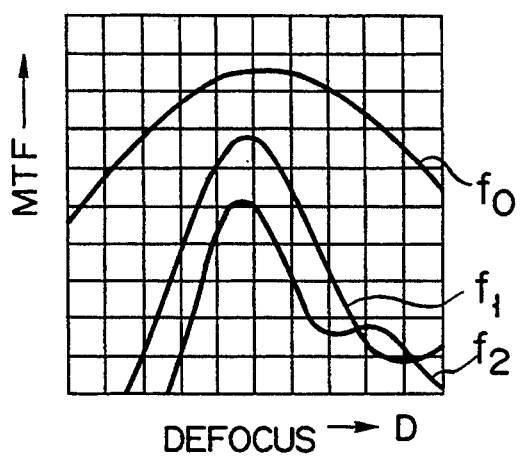
FIGS. 4A, 4B, and 4C are graphs showing MTF characteristics for a standard object at central and peripheral portions of the frame in correspondence with areas a, b, and c on the frame shown in FIG. 3.
Figure 4B:
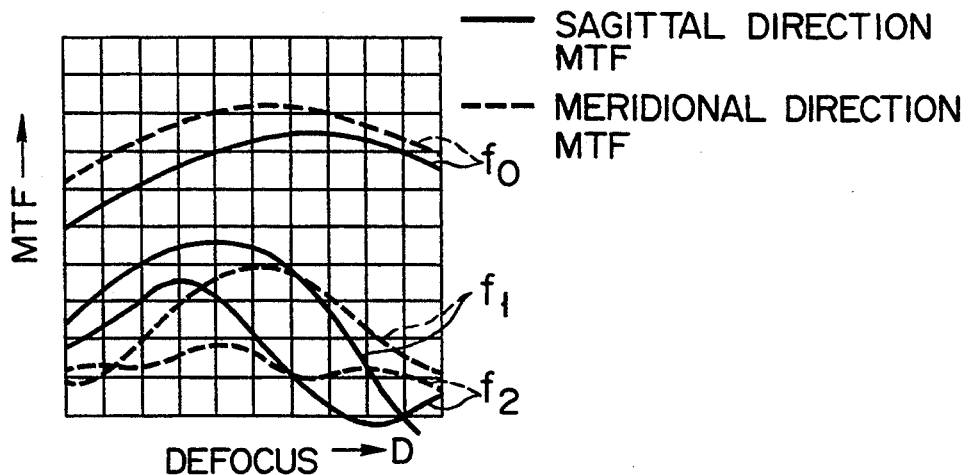
Figure 4C:
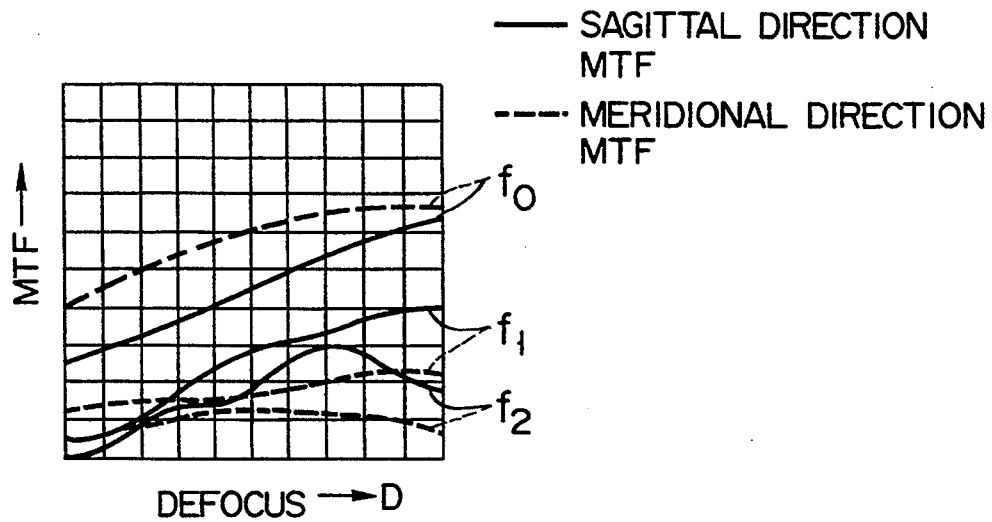

The MTF characteristic values stored in the ROM 44 will be described below. First, MTF characteristics for a standard object will be explained below. FIGS. 4A, 4B, and 4C respectively correspond to the areas a, b, and c in the frame 46 shown in FIG. 3, and separately illustrate MTF characteristics corresponding to defocuses D in units of frequencies ($f_0$, $f_1$, $f_2$) at the central and peripheral portions of the frame 46 as characteristics in sagittal and meridional directions. As for values of the frequencies, for example, $f_0$ falls within a range of 100 kHz to 200 kHz, and $f_1$ and $f_2$ have values about twice to five times that of $f_0$. Note that, as shown in FIG. 4A, since the sagittal and meridional MTF characteristics at the central portion of the frame have small differences, each of them is illustrated as a single characteristic curve.

The MTF characteristic values corresponding to the distance measurement areas will be described below. The MTF characteristic values corresponding to the distance measurement areas include a defocus correction value $h_A$ and a defocus allowable width $h_B$. The defocus correction value $h_A$ is obtained based on an MTF characteristic curve of a standard object in a corresponding area, and is expressed by a defocus of an MTF peak point (in-focus point) at the relatively low detection frequency $f_0$, and a deviation of the defocus of the MTF peak value at the relatively high detection frequency $f_1$. Therefore, when a correction value is added to the defocus of the MTF peak point at the low frequency $f_0$, peak point at the frequency $f_1$, i.e., an in-focus point can be predicted.

Therefore, if a range associated with the predicted in-focus point is designated as a drive range of the relay lens 20 in the focus detection operation at the detection frequency $f_1$, a focus detection operation can be quickly and effectively performed. Furthermore, the predicted in-focus point can also be utilized to evaluate whether or not a detected in-focus point is proper.

The defocus allowable width $h_B$ is obtained based on sharpness of the MTF characteristics. In a depth mode, data corresponding to values at the frequencies $f_0$ and $f_1$ ($f_0<f_1$) are weighted to set an aperture value falling within the depth of field. When a detected focal point position at the relatively high frequency $f_1$ is improper, the aperture value cannot be calculated. Therefore, in this case, the aperture is set so that the value of the allowable width $h_B$ falls within the depth of field.

The MTF characteristics are registered in correspondence with the distance measurement areas. For example, each of an ordinate $\underline{x}$ and an abscissa $\underline{y}$ of a frame 48 shown in FIG. 5 is divided into five areas, and characteristic value data $H_{00}$ to $H_{44}$ shown in FIG. 6 are assigned to divided areas $A_{00}$ to $A_{44}$. Data $H_{xy}$ are stored in the ROM 44. In this case, the defocus correction value $h_A$ is stored in upper bits, and the defocus allowable value $h_B$ is stored in lower bits on the data area of the ROM.

As a method effective for a case wherein the ROM 44 has a small memory capacity, or wherein the number of divisions of areas is large, as shown in FIG. 7, a frame 50 is divided into four areas, and the divided ¼ area is further divided into areas $B_{00}$ to $B_{mn}$. MTF characteristic values $H_{00}'$ to $H_{mn}'$ (not shown) are then assigned to these areas $B_{00}$ to $B_{mn}$. For a portion outside the ¼ area of the frame 50, the characteristic values $H_{00}'$ to $H_{mn}'$ are also assigned to the corresponding symmetrical areas under an assumption that the MTF characteristics of the photographing lens 12 have symmetricity about an optical axis.

Figure 8:
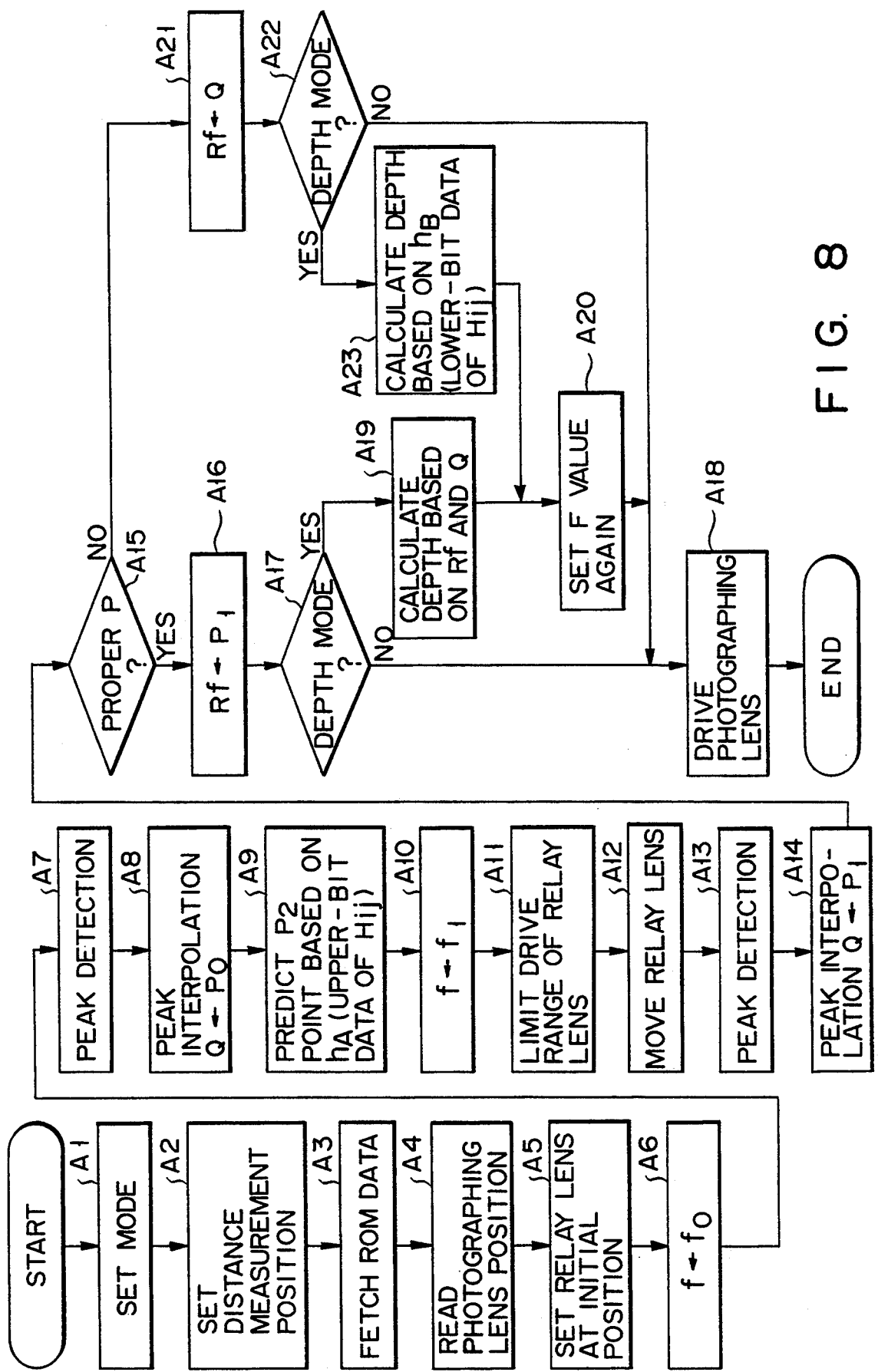
FIG. 8 is a flow chart of a detection operation of the focus detection apparatus shown in FIG. 1.

A detection operation of the focus detection apparatus of this embodiment will be described below with reference to the flow chart shown in FIG. 8. In steps A1 and A2, a normal mode or a depth mode for setting the aperture value so that defocus amounts for the peaks at different frequencies fall within the depth of field is selected, and a distance measurement position is set. In step A3, the MPU 32 fetches an MTF characteristic value $H_{ij}$ corresponding to an area of the ROM 44. The position of the photographing lens 12 is read by the lens encoder 38 (step A4). Since the relative positional relationship between the relay lens 20 and the photographing lens 12 can be easily obtained, the relay lens 20 is set to be located at a position corresponding to, e.g., an infinity of the photographing lens 12 (step A5). Thereafter, a peak point detection operation is performed by driving the relay lens 20.

Figure 9:
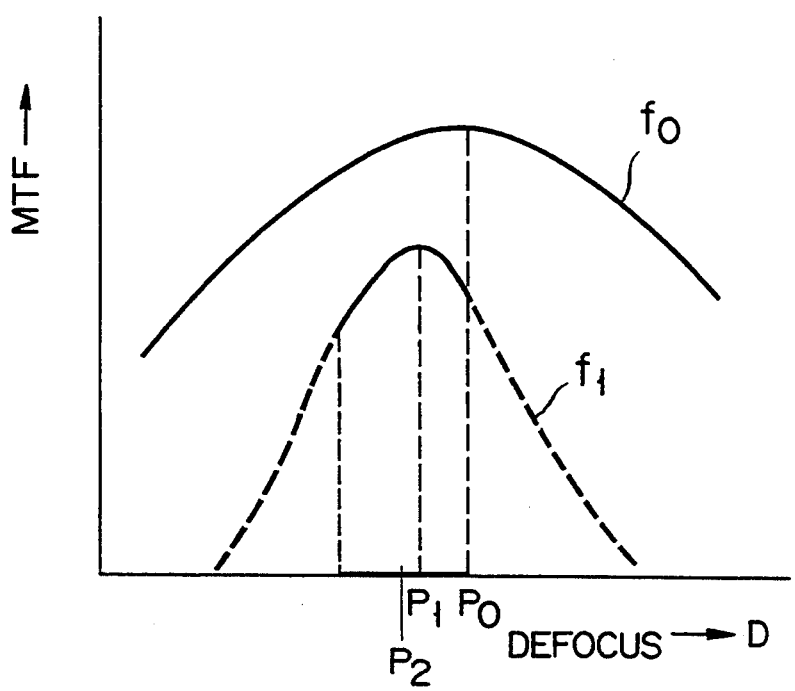
FIG. 9 is a graph showing MTF characteristics corresponding to defocuses D at respective frequencies and for explaining peak value detection.

In step A6, a detection frequency is set at the relatively low frequency $f_0$. In step A7, a peak point of a contrast signal at the detection frequency $f_0$ is detected. FIG. 9 illustrates MTF characteristics corresponding to defocuses D at the respective frequencies. A defocus $P_0$ of a peak point is calculated by an interpolation method using three points of a detection point defocus, and is substituted in Q (step A8).

The defocus correction value $h_A$ is calculated using the characteristic value $H_{ij}$ of the distance measurement area fetched in step A3. The defocus Q is corrected by the correction value $h_A$, thus predicting an in-focus point $P_2$ for the relatively high frequency $f_1$ (step A9). The detection frequency is then set at the frequency $f_1$ (step A10). Since a peak point at the detection frequency $f_1$ as a high-frequency component is present in a limited area near the point $P_2$ predicted in step A9, the drive range of the relay lens 20 is limited, so that a peak point is detected from the limited area (step A11). The limited drive range is set to have an amount enough to efficiently perform contrast detection for the predicted point $P_2$. The relay lens 20 is moved to the set drive range (step A12), thereby obtaining a detection point defocus $P_1$ of a peak value of the contrast signal (step A13). Note that the drive range of the relay lens 20 in this detection operation is defined as a limited range including the predicted in-focus point. The defocus $P_1$ of the peak point is obtained by the interpolation method using three points of the defocus obtained in step A13, and is substituted in P (step A14).

Whether or not the value of the defocus P is proper is checked in step A15. This checking operation is performed using the following criteria, that is, by checking, as for three points of the detection point defocus $P_1$ used in the interpolation, whether or not an MTF value itself is sufficiently large at a detection point and whether or not MTF values corresponding to the three points have a difference enough to obtain a peak point, or by checking whether or not the value of the defocus $P_1$ is considerably different from the predicted value $P_2$ obtained in step A9. It is determined that the value of the defocus P is improper when an object is dark, and a signal has a low S/N ratio, or when an object has a low frequency. In the former case, as the object has a higher frequency component, a decrease in S/N ratio considerably influences precision. In the latter case, since an object originally has no high-frequency component, a detection result at the frequency $f_1$ has poor reliability, and it is determined that the defocus is improper.

If it is determined in step A15 that the defocus is proper, the value $P_1$ is substituted in a detected in-focus point defocus Rf (step A16). It is then checked if the normal mode is the depth mode (step A17). If the normal mode is set, the photographing lens 12 is extended to a position corresponding to the in-focus defocus Rf in step A18, thus ending focus detection processing. If it is determined in step A17 that the set mode is the depth mode, the flow advances to step A19, and an aperture Fno. is obtained by a depth calculation using the defocuses Q and Rf with respect to the frequencies $f_0$ and $f_1$. That is, $$Fno. > |Rf-Q|/k \qquad (1)$$

where $\underline{k}$ is a predetermined constant, which is set to be, e.g., 0.033 or any other values. In step A20, the aperture is set again based on Fno., and the flow then advances to step A18. In this case, the photographing lens 12 is driven to an intermediate position between the defocuses Rf and Q.

If it is determined in step A15 that the value of the defocus P is improper, the flow advances to step A21. The defocus Q corresponding to the frequency $f_0$ and obtained in step A8 is substituted in the in-focus point defocus Rf. Subsequently, it is checked in step A22 if the depth mode is set. If NO in step A22, the flow advances to step A18. If YES in step A22, the flow advances to step A23 and a depth calculation is performed using the defocus allowable width $h_B$ in the MTF characteristic value data $H_{ij}$ fetched in step A3, thereby obtaining the aperture Fno. More specifically, the aperture is calculated using the $h_B$ in place of $|Rf-Q|$ in equation (1) by the following equation:

$$Fno. > h_B/k \qquad (2)$$

Thereafter, the flow advances to step A20.

Note that in place of the defocus allowable value $h_B$ stored in the ROM 44, defocus deviation amounts of peak positions corresponding to the frequencies $f_0$ and $f_1$ on the MTF characteristics of a standard object, or peak position deviation amounts in sagittal and meridional directions with respect to the frequency $f_0$ on the MTF characteristics may be used.

Figure 10:
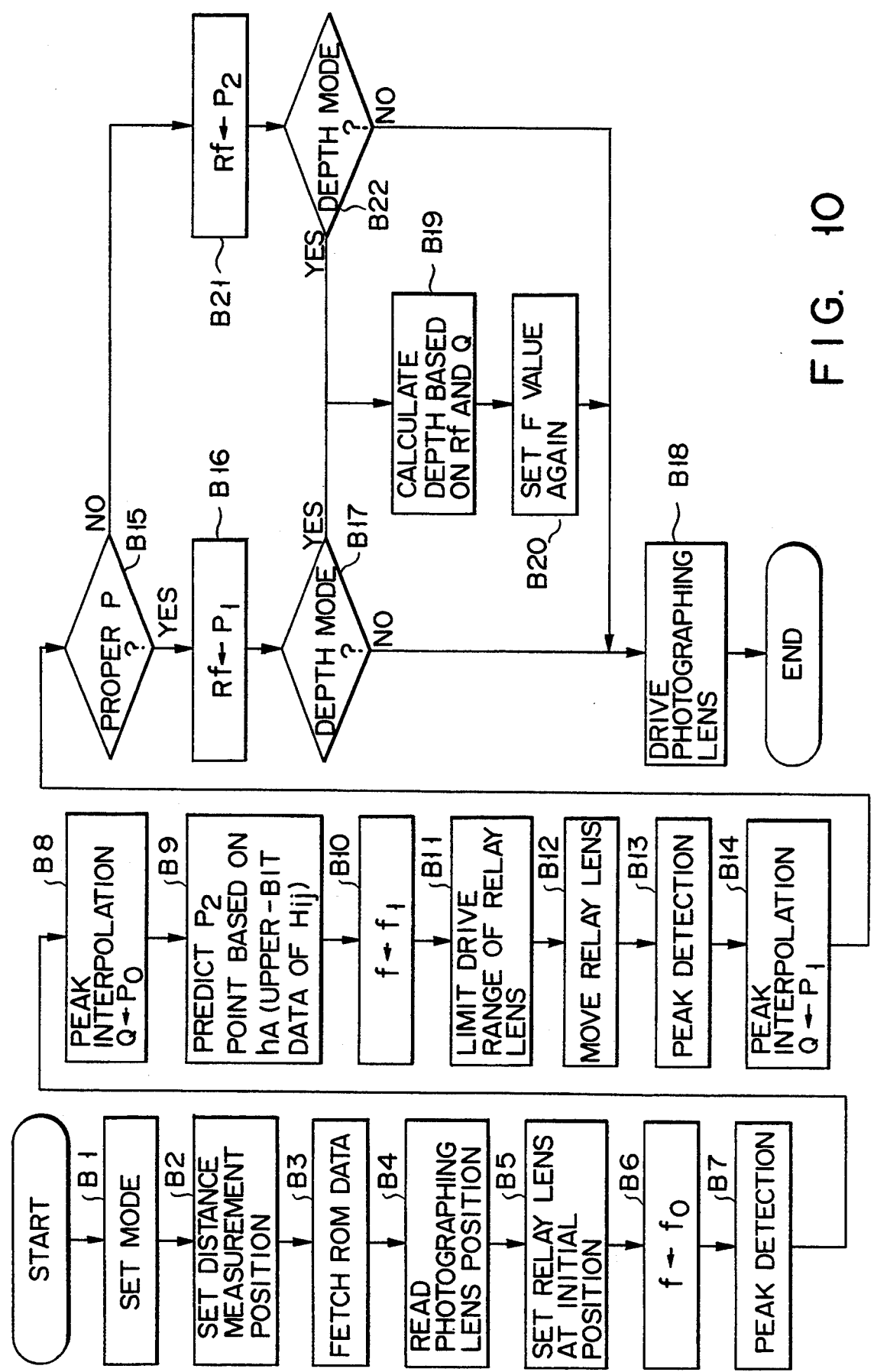
FIG. 10 is a flow chart of a detection operation of a focus detection apparatus according to the second embodiment of the present invention.

Furthermore, in this embodiment, Q is substituted in Rf when it is determined that P is improper. However, the present invention is not limited to this. For example, the present invention may be modified, as shown in the flow chart of FIG. 10. In this flow chart, when it is determined in step B15 that P is improper, $P_2$ predicted in step B9 may be substituted in Rf. In this case, if the depth mode is determined in step B22, the flow advances to step B19, and an aperture Fno. is obtained by a depth calculation using the defocuses Q and Rf corresponding to the frequencies $f_0$ and $f_1$. Other steps B1 to B20 and step B22 are the same as steps A1 to A20 and step A22 shown in FIG. 8, and a detailed description thereof will be omitted.

Figure 11:
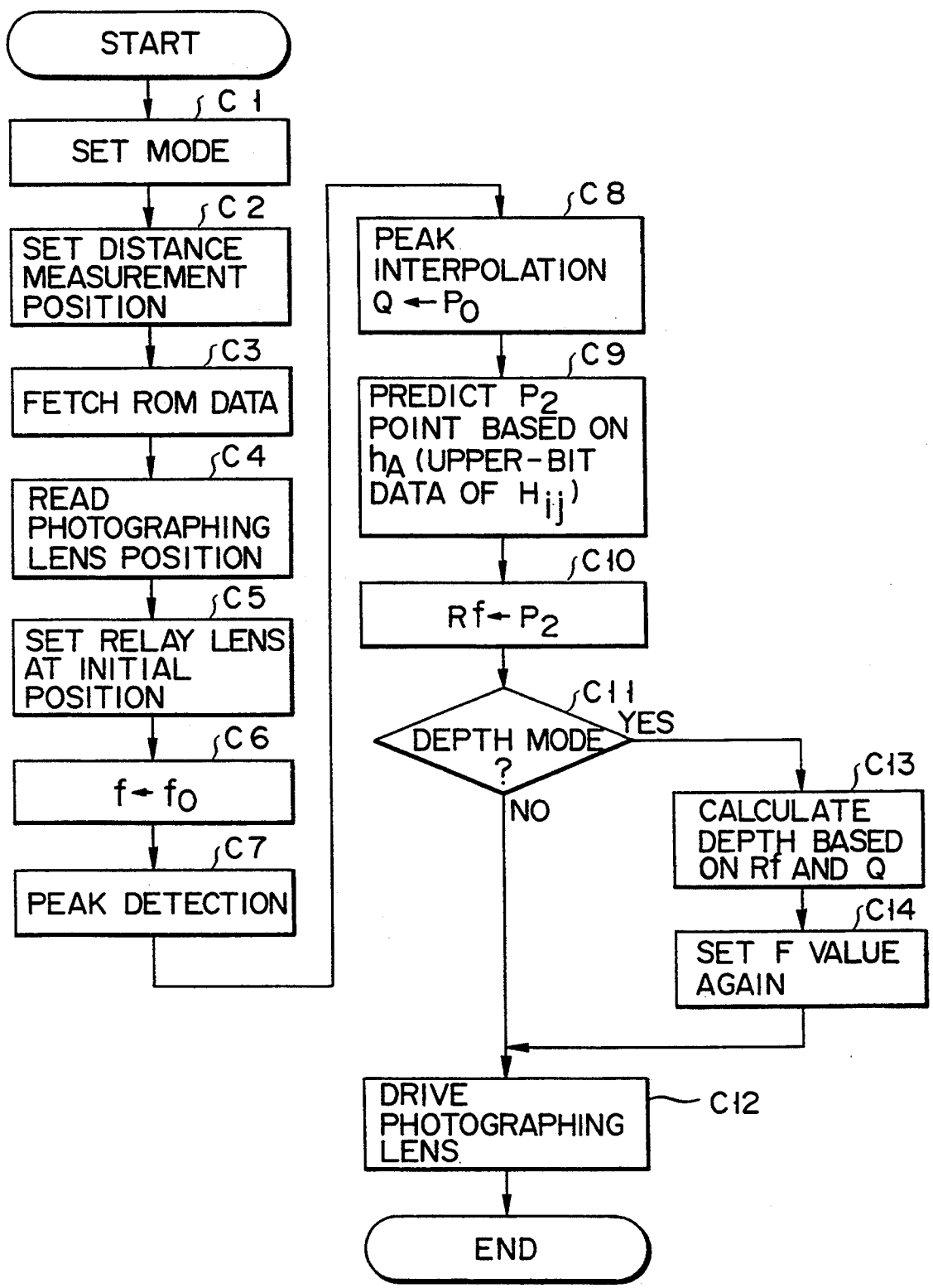
FIG. 11 is a flow chart of a detection operation of a focus detection apparatus according to the third embodiment of the present invention.

When the predicted $P_2$ is reliable to some extent, the photographing lens 12 may be driven according to the predicted $P_2$. FIG. 11 is a flow chart for explaining such an operation. In FIG. 11, steps C1 to C9, and steps C10, C11, C12, C13, and C14 are respectively the same as steps B1 to B9, and steps B21, B22, B18, B19, and B20 in the flow chart shown in FIG. 10, and a detailed description thereof will be omitted. In this manner, since no peak detection at a high frequency is performed, a focus detection time can be shortened.

Figure 12:
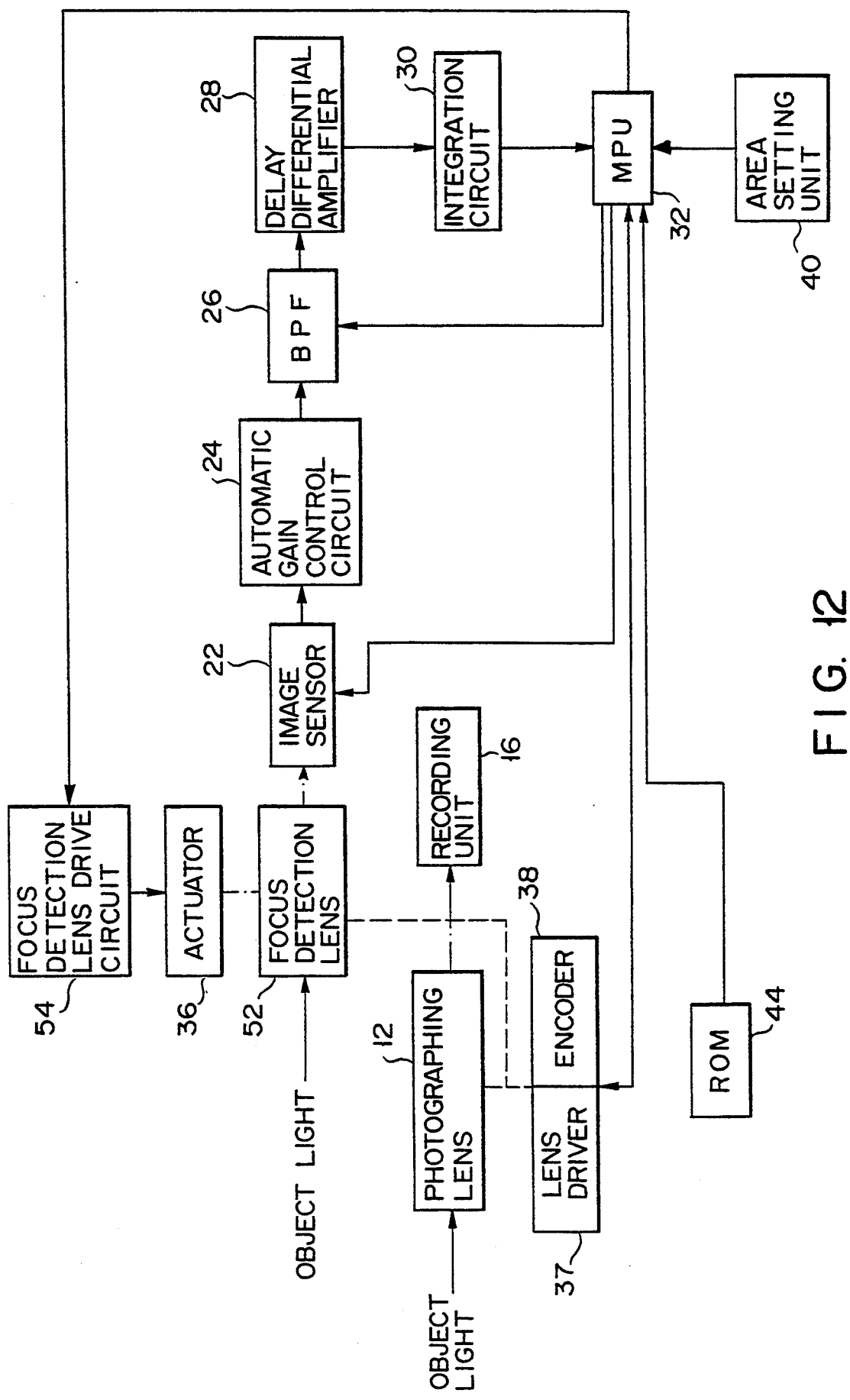
FIG. 12 is a block diagram of a focus detection apparatus according to the fourth embodiment of the present invention.

The above embodiments have been described based on the arrangement shown in FIG. 1. However, a focus detection lens may be arranged as an optical system independently of a photographing lens, as shown in FIG. 12. More specifically, the half mirror 14 and the mirror 18 are omitted from the arrangement shown in FIG. 1, a focus detection lens 52 is used in place of the relay lens 20, and a focus detection lens drive circuit 54 is used in place of the relay lens drive circuit 34.

when a photographing operation can be performed while moving a photographing lens like in a video camera, the photographing lens may be directly controlled without using a relay lens to perform focus detection.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A focus detection apparatus comprising:
   distance measurement area setting means for selectively setting one of a plurality of distance measurement areas of a photographing area defined by a photographing lens;
   an area type charge storage type photoelectric conversion element for receiving an object light beam and photoelectrically converting the object light beam;
   defocusing-amount changing means for changing a defocus amount of the object light beam received by said photoelectric conversion element;
   contrast signal peak value detection means for detecting a contrast signal corresponding to a specific detection frequency based on an output signal, corresponding to the set distance measurement area, of outputs from said photoelectric conversion element while said defocusing-amount changing means changes the defocus amount of the object light beam, and for detecting a defocusing position where the contrast signal exhibits a peak value;
   storage means for storing a plurality of deviation amounts of a peak position of a contrast signal detected at a different detection frequency from the defocusing position of the contrast signal detected at said specific detection frequency, for a single object in units of distance measurement areas; and
   prediction means for correcting the defocusing position where the contrast signal detected at the specific detection frequency exhibits the peak value using the deviation amounts of the peak position of the contrast signal detected at the different detection frequency, thereby predicting an in-focus position.

2. An apparatus according to claim 1, wherein said area type charge storage type photoelectric conversion element includes an area comprising a plurality of portions, said storage means stores a deviation amount of the peak position of the contrast signal detected at the different detection frequency from the defocusing position of the contrast signal detected at said specific detection frequency.

3. An apparatus according to claim 1, wherein said contrast signal peak value detection means obtains the peak value of the contrast signal using said different detection frequency which is a high frequency near the in-focus position predicted by said prediction means.

4. An apparatus according to claim 3, wherein said prediction means predicts a second in-focus position corresponding to a second peak value of the contrast signal obtained at said high frequency, and further comprising calculation means for calculating an aperture value with which both said in-focus position corresponding to a first peak value of the contrast signal obtained at the specific detection frequency, and said second in-focus position fail within a depth of field.

5. An apparatus according to claim 1, wherein said defocusing-amount changing means has a half mirror for splitting the object light beam passing through said photographing lens, a relay lens arranged midway along a path between said half mirror and said photoelectric conversion element, and drive means for driving said relay lens, said relay lens being scanned to change the defocus amount of the object light beam which said photoelectric conversion element is to receive.

6. An apparatus according to claim 5, wherein a scanning range of said relay lens is determined such that said relay lens scans an entire area at the specific detection frequency, and scans a limited area including the in-focus position predicted by said prediction means at other frequencies.

7. An apparatus according to claim 1, further comprising means for driving said photographing lens to the in-focus position predicted by said prediction means.

8. An apparatus according to claim 1, wherein said storage means further stores a defocus allowable width, and said contrast signal peak value detection means detects a first peak value of the contrast signal at the specific detection frequency, and detects a second peak value of the contrast signal at said different detection frequency and
   further comprising means for discriminating whether or not the second peak value is reliable, when said discriminating means discriminates that the second peak value is not reliable, said photographing lens being driven to a first in-focus position corresponding to the first peak value in a normal mode, and a first aperture value with which the first in-focus position falls within a depth of field being calculated using the defocus allowable width in the depth mode.

9. An apparatus according to claim 1, wherein said contrast signal peak value detection means detects a first peak value of the contrast signal at the specific detection frequency, and detects a second peak value of the contrast signal at said different detection frequency, and 10. An apparatus according to claim 1, wherein said contrast signal peak value detection means comprises frequency division means for selectively extracting a specific frequency component from a video signal output from said photoelectric conversion element.

further comprising means for discriminating whether or not the second peak value is reliable, and photographing lens driving means for, when said discriminating means discriminates that the second peak value is not reliable, driving said photographing lens to a position corresponding to a predicted value of the in-focus position obtained by the prediction means based on the contrast signal detected at the specific detection frequency.

11. An apparatus according to claim 1, wherein said defocus amount changing means has an optical lens different from said photographing lens, and drive means for driving the optical lens.

12. An apparatus according to claim 1, wherein said photoelectric conversion element is an area sensor, and said storage means stores the deviation amount of the peak position for each of said plurality of distance measurement areas.

13. A focus detection apparatus comprising:
a charge storage type photoelectric conversion element for receiving an object light beam and photoelectrically converting the object light beam;
defocusing-amount changing means for changing a defocus amount of the object light beam received by said photoelectric conversion element;
contrast signal peak value detection means for detecting a contrast signal corresponding to a reference detection frequency based on an output signal, corresponding to a set distance measurement area, of outputs from said photoelectric conversion element while said defocusing-amount changing means changes the defocus amount of the object light beam, and for detecting a defocusing position where the contrast signal exhibits a peak value;
storage means for prestoring a deviation amount between the defocusing position with respect to the reference detection frequency and a defocusing position where a contrast signal of another detection frequency exhibits a peak value; and
prediction means for correcting the defocusing position where the contract signal exhibits the peak value at the reference detection frequency using the deviation amount of the peak value stored in said storage means, thereby predicting an in-focus position.

14. An apparatus according to claim 13, wherein said contrast signal peak value detection means obtains the peak value of the contrast signal using said different detection frequency which is a high frequency near the in-focus position predicted by said prediction means.

15. An apparatus according to claim 13, further comprising means for driving a photographing lens to the in-focus position predicted by said prediction means.

16. An apparatus according to claim 12, wherein said contrast signal peak value detection means detects a first peak value of the contrast signal corresponding to the reference detection frequency, and detects a second peak value of the contrast signal corresponding to a detection frequency different from the reference detection frequency, and further comprising means for discriminating whether or not the second peak value is reliable, and photographing lens driving means for, when said discriminating means discriminates that the second peak value is not reliable, driving said photographing lens to a position corresponding to a predicted value of the in-focus position obtained by the prediction means based on the contrast signal detected at the reference detection frequency.

17. An apparatus according to claim 13, wherein said defocusing-amount changing means has a half mirror for splitting the object light beam passing through a photographing lens, a relay lens arranged midway along a path between said half mirror and said photoelectric conversion element, and drive means for driving said relay lens, said relay lens being scanned to change the defocus amount of the object light beam which said photoelectric conversion element is to receive.

18. An apparatus according to claim 17, wherein a scanning range of said relay lens is determined such that said relay lens scans an entire area at the reference detection frequency, and scans a limited area including the in-focus position predicted by said prediction means at other frequencies.

19. An apparatus according to claim 13, wherein said charge storage type photoelectric conversion element comprises an area sensor, which is divided into areas, and said storage means stores the deviation amounts corresponding to the areas of a peak value in units of areas.

20. An apparatus according to claim 13, wherein said charge storage type photoelectric conversion element which comprises an area sensor divides an area thereof into a plurality of portions, said storage means stores deviation amounts of a peak value of some divided portions, and corresponding deviation amounts are selected and used for remaining portions under an assumption that deviation amounts stored in said storage means have symmetricity about an optical axis.

21. An apparatus according to claim 20, further comprising means for setting a distance measurement range from a plurality of distance measurement ranges, said prediction means obtaining, in the distance measurement range set by said setting means, the contrast signal on the basis of a signal corresponding to the distance measurement range from an output of said photoelectric conversion element, and correcting the contrast signal on the basis of the deviation amount of the peak position corresponding to the detected distance measurement range stored in said storage means.

22. An apparatus according to claim 13, wherein said contrast signal peak value detection means comprises frequency division means for selectively extracting a specific frequency component from a video signal output from said photoelectric conversion element.

23. A focus detection apparatus comprising:

a charge storage type photoelectric conversion element for receiving an object light beam and photoelectrically converting the object light beam;

defocusing-amount changing means for changing a defocus amount of the object light beam received by said photoelectric conversion element;

contrast signal peak value detection means for detecting a contrast signal corresponding to a specific detection frequency based on an output signal, corresponding to a set distance measurement area, of outputs from said photoelectric conversion element while said defocusing-amount changing means changes a defocus amount of the object light beam, and for detecting a defocusing position where a peak value of the contrast signal is obtained, thereby determining a first in-focus position based on said defocusing position where said peak value is obtained;

storage means for prestoring a deviation amount between the defocusing position with respect to the specific detection frequency and a defocusing position where a contrast signal of another detection frequency exhibits a peak value;

prediction means for correcting the defocusing position where the contrast signal exhibits the peak value at the specific detection frequency using the deviation amount stored in said storage means, thereby predicting a second in-focus position; and calculation means for calculating based on said first in-focus position and the second in-focus position an aperture value with which said first and second in-focus positions fall within a depth of field.

24. An apparatus according to claim 23, wherein said calculation means obtains a third in-focus position recognized based on the second in-focus position, and said calculation means calculates, based on said first and third in-focus positions, the aperture value with which both the first and third in-focus positions fall within the depth of field.

25. A focus detection apparatus comprising:

focus detection area setting means for selecting and setting one distance measurement area to be subjected to focus detection from a plurality of distance measurement areas in a photographing area;

a photoelectric conversion element, arranged in correspondence with the plurality of distance measurement areas, for receiving an object light beam, and photoelectrically converting the object light beam;

contrast signal peak value detection means for detecting a peak value of a contrast signal corresponding to a first detection frequency on the basis of an output from said photoelectric conversion element;

peak position prediction means for predicting a peak position of a contrast signal corresponding to a second detection frequency in accordance with the detected peak value;

in-focus point detection means for detecting a peak value of the contrast signal corresponding to the second detection frequency near the predicted peak position on the basis of the output from said photoelectric conversion element, and obtaining an in-focus point; and MTF characteristic value storage means for storing MTF characteristic values, each representing a difference between the peak positions of the contrast signals corresponding to the first and second detection frequencies, in correspondence with the plurality of distance measurement areas, wherein said peak position prediction means obtains the predicted peak position on the basis of a stored value corresponding to the distance measurement area stored in said MTF characteristic value storage means, and the output from said contrast signal peak value detection means.

26. An apparatus according to claim 25, wherein said second detection frequency is higher than the first detection frequency.

27. A focus detection apparatus for obtaining an in-focus point on the basis of contrast data of an object corresponding to a plurality of detection frequencies, comprising:

a plurality of photoelectric conversion elements, arranged in correspondence with a plurality of distance measurement areas in a photographing area, for photo-electrically converting an object light beam passing through a photographing lens;

storage means for storing MTF characteristic values each representing a difference between a peak position of a contrast signal corresponding to a reference detection frequency, and a peak position of a contrast signal corresponding to another detection frequency, in correspondence with the plurality of distance measurement areas;

selection means for selecting one of the plurality of distance measurement areas in the photographing area;

readout means for reading out the MTF characteristic value corresponding to the distance measurement area selected by said selection means from said storage means;

a relay lens arranged in an optical path between said photographing lens and said photoelectric conversion elements;

relay lens driving means for driving said relay lens;

peak value detection means for detecting a peak value of the contrast signal corresponding to the reference detection frequency on the basis of an output from the photoelectric conversion element corresponding to the selected distance measurement area upon driving of the driven relay lens; and means for limiting a driving area, which is used to detect a peak value of the contrast signal corresponding to another detection frequency, of said relay lens driving means on the basis of a detection result of said detection means, and the readout MTF characteristic value.

28. An apparatus according to claim 27, wherein said another detection frequency is higher than the reference detection frequency.

29. A focusing method of obtaining an in-focus point based on contrast data of an object in a distance measurement area which is selected from a plurality of distance measurement areas in a photographing area, and driving a photographing lens, comprising the steps of:

(a) setting the selected distance measurement area;

(b) reading out an MTF characteristic value corresponding to the selected distance measurement area stored in storage means;

(c) obtaining a contrast peak value of a first detection frequency component, and detecting a position of a first peak value;

(d) predicting an existing area of a contrast peak value of a second detection frequency component higher than the first detection frequency component on the basis of the readout MTF characteristic value and the detected position of the first peak value;

(e) obtaining a contrast peak value of the second detection frequency component in accordance with the predicted existing area of the peak value, and detecting a second peak value; and (f) driving said photographing lens in accordance with the positions of the first and second peak values.

30. A focus detection apparatus comprising:

an area type charge storage type photoelectric conversion element for receiving an object light beam and photoelectrically converting the object light beam;

contrast signal peak value detection means for detecting a contrast signal corresponding to a specific detection frequency based on a signal output by said photoelectric conversion element, and detecting a defocus position where the contrast signal has a peak value;

storage means for storing a deviation amount between a peak value of a contrast signal of a detection frequency and the peak value of the contrast signal of the specific detection frequency; and prediction means for correcting the peak value of the contrast signal detected at the specific detection frequency in accordance with the deviation amount stored in said storage means, thereby to predict an in-focus position.

31. An apparatus according to claim 30, wherein said detection means detects a defocus position where the contrast signal related to the specific detection frequency has the peak value from the signal output from said photoelectric conversion element, and said storage means stores the deviation amount for said photoelectric conversion element.

* * * * *

UNITED STATES PATENT AND TRADEMARK OFFICE
CERTIFICATE OF CORRECTION

PATENT NO. : 5,353,089

DATED : October 4, 1994

INVENTOR(S) : Yaji

It is certified that error appears in the above-identified patent and that said Letters Patent is hereby corrected as shown below:

On the title page, item [75], Abstract line 1, delete " of the invention can " and change " select " to -- selects --.

Signed and Sealed this

Twelfth Day of March, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.   : 5,353,089

DATED        : October 4, 1994

INVENTOR(S)  : Yaji

It is certified that error appears in the above-identified patent and that said Letters Patent is hereby corrected as shown below:

On the title page, item [57] Abstract line 1, delete "of this invention can" and change "select" to --selects--.

This certificate supersedes Certificate of Correction issued March 12, 1996.

Signed and Sealed this

Thirteenth Day of May, 1997

Attest:

BRUCE LEHMAN

Attesting Officer

Commissioner of Patents and Trademarks